United States Patent
Olkkonen et al.

(10) Patent No.: US 11,650,427 B2
(45) Date of Patent: May 16, 2023

(54) DIFFRACTIVE DISPLAY ELEMENT WITH GRATING MIRROR

(71) Applicant: DISPELIX OY, Espoo (FI)

(72) Inventors: Juuso Olkkonen, Espoo (FI); Petri Myöhänen, Espoo (FI)

(73) Assignee: DISPELIX OY, Espoo (FI)

( * ) Notice: Subject to any disclaimer, the term of this patent is extended or adjusted under 35 U.S.C. 154(b) by 261 days.

(21) Appl. No.: 16/967,407

(22) PCT Filed: Jan. 30, 2019

(86) PCT No.: PCT/FI2019/050065
§ 371 (c)(1),
(2) Date: Aug. 4, 2020

(87) PCT Pub. No.: WO2019/155117
PCT Pub. Date: Aug. 15, 2019

(65) Prior Publication Data
US 2021/0215942 A1    Jul. 15, 2021

(30) Foreign Application Priority Data
Feb. 6, 2018   (FI) .................................... 20185105

(51) Int. Cl.
*G02B 27/09* (2006.01)
*G02B 27/01* (2006.01)

(52) U.S. Cl.
CPC ..... *G02B 27/0944* (2013.01); *G02B 27/0172* (2013.01)

(58) Field of Classification Search
CPC .. G02B 1/111; G02B 13/002; G02B 13/0075; G02B 13/02; G02B 13/20; G02B 13/24;
(Continued)

(56) References Cited

U.S. PATENT DOCUMENTS 9,715,110 B1    7/2017    Brown et al.
9,791,703 B1   10/2017    Vallius et al.
(Continued)

FOREIGN PATENT DOCUMENTS

CN       107167920 A      9/2017
WO     2008148927 A1     12/2008
(Continued)

OTHER PUBLICATIONS

FI Search Report in Application No. 20185105 dated Aug. 20, 2018.
EP Search Report in Application No. 19751485 dated Oct. 6, 2021.

*Primary Examiner* — Collin X Beatty
*Assistant Examiner* — Grant A Gagnon
(74) *Attorney, Agent, or Firm* — Maschoff Brennan (57) ABSTRACT

There is provided a diffractive display element comprising a waveguide body, an in-coupling region for diffractively coupling light into the waveguide body, and an out-coupling region for diffractively coupling light out of the waveguide body, said light being adapted to propagate from said in-coupling region to the out-coupling region along a primary route. According to the invention, the element further comprises at least one grating mirror outside said primary route for diffractively mirroring light strayed from said primary route back to said primary route. The invention allows for increasing the efficiency of waveguide-based personal displays.

21 Claims, 5 Drawing Sheets

(58) Field of Classification Search
CPC .......... G02B 13/26; G02B 15/143107; G02B 17/0631; G02B 17/082; G02B 19/0004; G02B 19/0033; G02B 19/0047; G02B 2006/12061; G02B 2006/12069; G02B 2006/12083; G02B 2006/12092; G02B 2006/12095; G02B 2006/12102; G02B 2006/1215; G02B 2006/1218; G02B 21/0004; G02B 21/0052; G02B 21/0076; G02B 21/025; G02B 21/04; G02B 21/08; G02B 21/086; G02B 21/10; G02B 21/241; G02B 21/244; G02B 21/26; G02B 21/36; G02B 2207/101; G02B 2207/109; G02B 2207/113; G02B 23/2453; G02B 23/2484; G02B 23/26; G02B 26/007; G02B 26/08; G02B 26/0883; G02B 27/0043; G02B 27/005; G02B 27/04; G02B 27/0916; G02B 27/0988; G02B 27/146; G02B 27/4222; G02B 27/4238; G02B 27/4255; G02B 27/4288; G02B 27/56; G02B 27/60; G02B 27/644; G02B 30/22; G02B 30/32; G02B 5/0226; G02B 5/0231; G02B 5/0247; G02B 5/0268; G02B 5/0289; G02B 5/0841; G02B 5/0875; G02B 5/13; G02B 5/1895; G02B 5/223; G02B 5/282; G02B 5/284; G02B 5/286; G02B 6/0013; G02B 6/008; G02B 6/0081; G02B 6/0083; G02B 6/0086; G02B 6/009; G02B 6/0091; G02B 6/0093; G02B 6/02; G02B 6/02052; G02B 6/02057; G02B 6/02085; G02B 6/102; G02B 6/12004; G02B 6/12007; G02B 6/12009; G02B 6/12014; G02B 6/12028; G02B 6/1228; G02B 6/13; G02B 6/132; G02B 6/1342; G02B 6/138; G02B 6/25; G02B 6/2713; G02B 6/2726; G02B 6/2793; G02B 6/2808; G02B 6/2817; G02B 6/29316; G02B 6/29323; G02B 6/29325; G02B 6/29334; G02B 6/29346; G02B 6/29349; G02B 6/29383; G02B 6/29394; G02B 6/3502; G02B 6/3504; G02B 6/3518; G02B 6/353; G02B 6/355; G02B 6/3552; G02B 6/3566; G02B 6/3572; G02B 6/3628; G02B 6/3636; G02B 6/3644; G02B 6/3652; G02B 6/3672; G02B 6/3692; G02B 6/3816; G02B 6/3818; G02B 6/3845; G02B 6/3885; G02B 6/4201; G02B 6/4202; G02B 6/4209; G02B 6/4212; G02B 6/4213; G02B 6/4232; G02B 6/425; G02B 6/4287; G02B 6/4292; G02B 6/4439; G02B 7/001; G02B 7/007; G02B 7/022; G02B 7/181; G02B 7/1815; G02B 7/1824; G02B 7/22; G02B 7/34; G02B 9/00; G02B 9/04; G02B 9/06; G02B 9/14; G02B 9/30
USPC .......................................... 359/630
See application file for complete search history.

(56) References Cited

U.S. PATENT DOCUMENTS

| 2008/0285137 | A1 | 11/2008 | Simmonds et al. |
| 2017/0219841 | A1 | 8/2017 | Popovich et al. |

FOREIGN PATENT DOCUMENTS

| WO | 2014080155 | A1 | 5/2014 |
| WO | 2018039271 | A1 | 3/2018 |
| WO | 2018039277 | A1 | 3/2018 |

DIFFRACTIVE DISPLAY ELEMENT WITH GRATING MIRROR

FIELD OF THE INVENTION

The invention relates to diffractive display technology. In particular, the invention relates to lightguide-based diffractive display elements comprising an in-coupling grating, an out-coupling grating and, optionally, an exit pupil expander (EPE) grating. Such display elements can be used in personal displays, such as head-mounted displays (HMDs), for example near-to-eye displays (NEDs), and head-up displays (HUDs).

BACKGROUND OF THE INVENTION

HMDs and HUDs can be implemented using waveguide technology. Light can be coupled to a waveguide, redirected therein or coupled out of the waveguide using diffraction gratings. In one conventional display design, light is directed from a projector to an in-coupling grating, which diffracts the incoming light into the waveguide, where it propagates via total internal reflections towards an out-coupling grating. The out-coupling grating diffracts light out of the waveguide, reproducing the image originally displayed to the in-coupling grating. An EPE grating can be used between the in- and out-coupling gratings to extend the viewable area of the display laterally.

One problem in waveguide-based displays is that the total efficiency of the waveguide element, i.e. a waveguide body and the gratings arranged thereon, is very low, typically about 0.1-5%. This is because relatively low coupling efficiencies of the gratings and other losses that take place while the light travels in the element.

Thus, there is a need for improved waveguide displays.

SUMMARY OF THE INVENTION

It is an aim of the invention to increase the efficiency of waveguide displays.

The aim is achieved by what is stated in the independent claims.

The invention is based on the idea of providing at least one grating-based mirror to the waveguide element such that light having strayed from the route from the in-coupling grating towards the out-coupling grating is returned to this route. That is, light otherwise lost is mirrored back to one of the gratings that define the "normal" route of light, and further towards the out-coupling grating.

According to one aspect, there is provided a diffractive display element comprising a waveguide body, an in-coupling region for diffractively coupling light into the waveguide body, and an out-coupling region for diffractively coupling light out of the waveguide body, said light being adapted to propagate from said in-coupling region to the out-coupling region along a primary route. According to the invention, the element further comprises at least one grating mirror outside said primary route for diffractively mirroring light strayed from said primary route back to said primary route.

Straying from the primary route can occur e.g. due to diffraction in one or more diffraction orders away from the primary route or due to travelling of a light ray across a grating region on the primary route without interacting therewith.

According to another aspect, there is provided a personal image display device, such as a comprising a diffractive display element of the present kind and an image projector for targeting an image to the in-coupling region where it is diffractively coupled into the lightguide for travelling vie total internal reflections. The image is out-coupled by the out-coupling region of the element towards an eye of the user, who sees the original image. The device can be a head-mounted display (HMD), such as a near-to-the-eye display (NED) or a head-up display (HUD).

The invention offers significant benefits. First of all, the invention in general increases the efficiency of the waveguide element, since the mirror gratings are capable of capturing light otherwise wasted and consequently more light is guided from the in-coupler to the out-coupler. This has the benefit that the brightness of the display is increased, or alternatively that the output power of the projector can be decreased.

Embodiments of the invention have further benefits. For example, when the grating mirror is used in connection with in-coupling or out-coupling grating, the uniformity of the image can be increased, as will be explained later in more detail.

Also, by means of the invention the size of the in-coupling grating can be decreased, which has a positive effect on the for factor of the display and size requirements.

It should be noted that edges of the waveguide cannot be used as mirrors (e.g. by coating them with reflective material) as they produce a mirror image that does not match with the original virtual image. However, the present grating-based mirror maintains the topology of the image and therefore strengthens it.

The dependent claims are directed to selected embodiments of the invention.

In some embodiments, the in-coupling region comprises a grating having an in-coupling period and the grating mirror comprises a grating having a grating mirror period, which amounts to half of the in-coupling period. This is particularly beneficial for an in-coupling grating mirror or a vertical EPE grating mirror, typically having a grating lines parallel to the grating lines of the in-coupling grating.

In some embodiments, the out-coupling region comprises a grating having an out-coupling period and the grating mirror comprises a grating having a grating mirror period, which amounts to half of the out-coupling period. This is particularly beneficial for an out-coupling grating mirror or a horizontal EPE grating mirror, typically having grating lines normal to the grating lines of the in-coupling grating.

In some embodiments, the grating mirror is adapted to use the first reflective diffraction order for said mirroring. In particular the first positive order can be used.

In some embodiments, the grating mirror is configured to reflect light essentially into an opposite propagation direction with respect to the propagation direction of the strayed light. However, oblique reflections can be used too, as will be exemplified later.

In some embodiments, the grating mirror is associated with, i.e. located behind, the in-coupling region, as seen from the primary route. In one example, the grating mirror is adapted to direct at least part of light diffracted from the in-coupling area to the grating mirror past the in-coupling region to the primary route. This can be used to increase intensity uniformity of the display. In another example, the in-coupling region is polarization-sensitive and the element comprises means for changing the polarization state of the mirrored light, for preventing out-coupling of mirrored light passing the in-coupling region. This further increases efficiency.

In some embodiments, the grating mirror is associated with, i.e. located behind, the out-coupling region, as seen from the primary route. This increases the overall efficiency of the display, and also, the uniformity of the image.

In some embodiments, the element further comprises an exit pupil expander (EPE) region forming part of the primary route. There are two grating mirrors associated with, i.e. located behind (as seen from the primary route) the EPE region, laterally on different sides thereof. This also improves the overall efficiency of the display, which has specific significance when an EPE is used as it otherwise causes significant losses while increasing the exit pupil of the display.

In typical embodiments, at least a majority of the grating mirror, typically the entire grating mirror, is located outside a zone, which is laterally spanned by the in-coupling and the out-coupling regions and, optionally, an exit pupil expander region. This zone is herein called a "primary propagation zone" which contains the primary route the light is intended to travel from the in-coupler to the out-coupler and further out of the waveguide.

In some embodiments, the dimension of the grating mirror in the primary mirroring direction is larger than the hop length of propagating light that is to be mirrored. This ensures maximum efficiency.

The number of grating mirrors on a single waveguide can be e.g. one, two, three or four. The four typical positions mentioned above are exemplified in detail below.

Next, embodiments of the invention and advantages thereof are discussed in more detail with reference to the attached drawings.

DETAILED DESCRIPTION OF EMBODIMENTS

Figure 1:
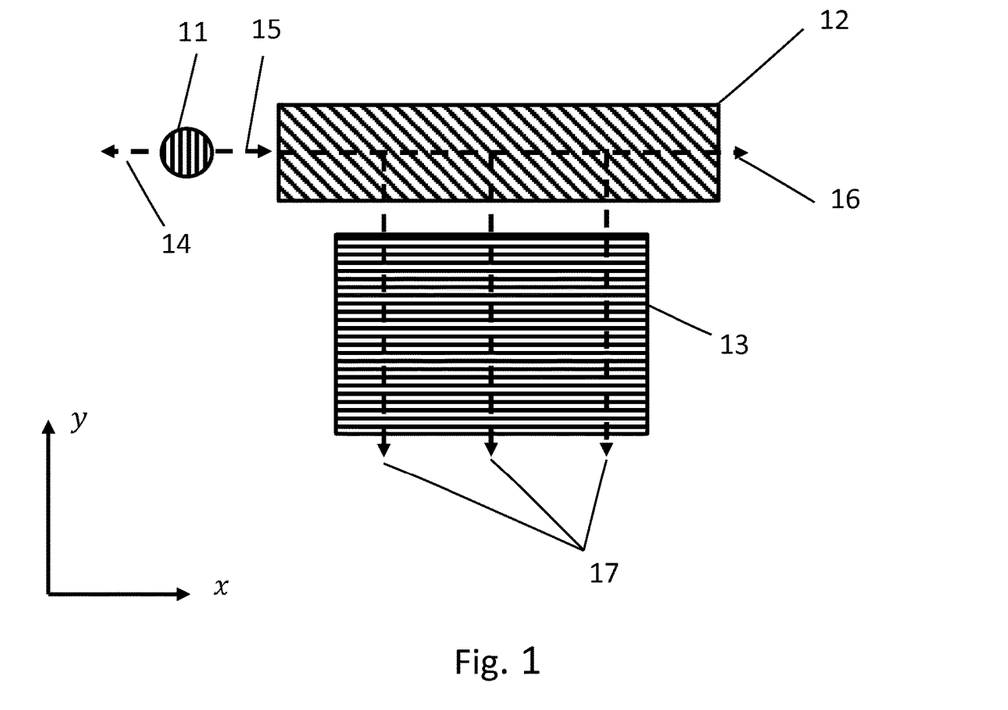
FIG. 1 shows a top view of a traditional grating setup.

FIG. 1 illustrates a traditional grating configuration for a diffractive lightguide. A lightguide surface contains an in-coupling 11, an exit pupil expansion (EPE) 12, and an out-coupling 13 grating. As discussed, the total efficiency of diffractive lightguides like this is typically relatively low. All gratings cause some light loses. The in-coupler produces by the +/−1 diffraction orders the rays 15 and 14. The energy of the ray 14 is lost. The EPE grating turns part of the incident energy of the ray 15 towards the out-coupler and the rest is lost via the ray 16. Out-coupler partially out-couples the rays coming from the EPE but rays 17 remain inside the lightguide after the out-coupler. The generally undesired, loss-causing rays 14, 16, 17 are herein collectively called "strayed light" or "stray rays".

By redirecting the stray rays 14, 16, and 17 onto the out-coupler by means of embodiments of the invention, the total efficiency of the lightguide is increased. As discussed, this is advantageously carried out using a grating, which acts as a mirror, thereby being capable of reflecting light essentially back to its original propagation direction.

To summarize, the strayed light may comprise e.g. light escaping the in-coupling region into opposite diffraction order than light directly directed to said primary route, light escaping the out-coupling region without being coupled out therefrom, light escaping an exit pupil expander region towards its original propagation direction, or light escaping an exit pupil expander region into opposite direction than the out-coupling region. Embodiments of the invention provide benefits in all of these cases.

In one example, the grating mirror is a linear (one-dimensional) grating having a period which is exactly half of the period of the in-coupling grating of the element. The grating line direction between these two gratings is typically the same or tilted by 90 degrees, depending on the position of use of the grating mirror. It should be noted that although an orthogonal geometry, where the EPE causes a 90-degree change in the propagation direction of light is exemplified herein, the invention can be used in any other geometry too.

Figure 2A:
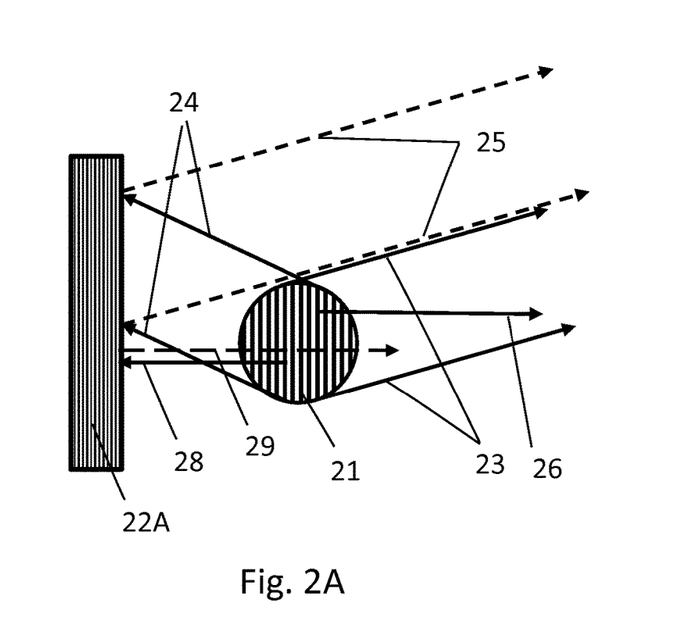
FIGS. 2A and 2B show detailed top views of a grating mirror is associated with an in-coupling grating.

FIG. 2A illustrates an in-coupling grating 21 ("in-coupler") that is accompanied with a grating mirror 22A. The first diffraction order of the in-coupler 22A produces rays 23, 26 towards the primary route, while the minus first orders produces rays 24, 28 that propagate towards the grating mirror 22A. The reflection from the grating mirror 22A of oblique rays 24 produces rays 25 that are parallel with rays 23, thus bypassing the in-coupler 21 towards the primary propagation path. This configuration can be used for example to increase brightness in particular on the corner area of the image, as illustrated more specifically in FIG. 5A. This area suffers from low brightness in conventional configurations.

Rays 28 that have low angle of incidence are, reflected back towards the in-coupler 21 as rays 29, whereby part of them is out-coupled by the in-coupler. This is generally undesired, but can be at least party prevented by using a polarization-sensitive in-coupler 21 and a grating mirror 22 that changes the polarization state of the incident light. Alternatively, there may be a polarization-changing element on a surface of the waveguide between the in-coupler 21 and the grating mirror 22A.

Figure 2B:
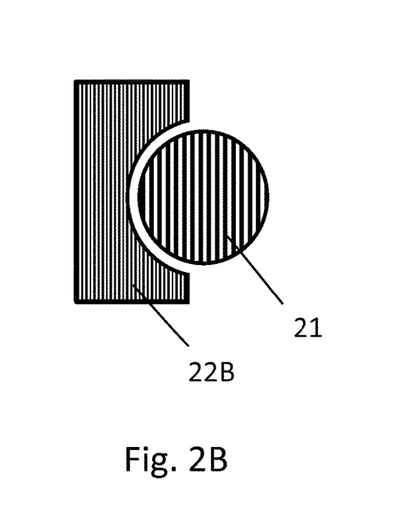

FIG. 2B shows an alternative embodiment where the grating mirror is partly arranged around the in-coupler, that is. Here, nearly half of the periphery of the in-coupler 21 is surrounded by the grating mirror 22B. This can be used to further increase efficiency by "capturing" strayed light.

The grating mirror 22A, 22B has a grating vector ($G_{M\_IC}$) that is otherwise the same as the grating vector of the in-coupler 21 ($G_{IC}$) but it is two times longer, i.e. $G_{M\_IC}=2 G_{IC}$. This means that the grating grooves of the in-coupler 21 and the grating mirror 22A, 22B are parallel but the period of the grating mirror 22A, 22B is only half from the period of the in-coupler 21. The grating mirror 22A, 22B needs to be so long in the direction of ray propagation that each ray will interact with the grating mirror 22A, 22B at least once. These advantageous principles generally apply to other embodiments too.

Figure 3:
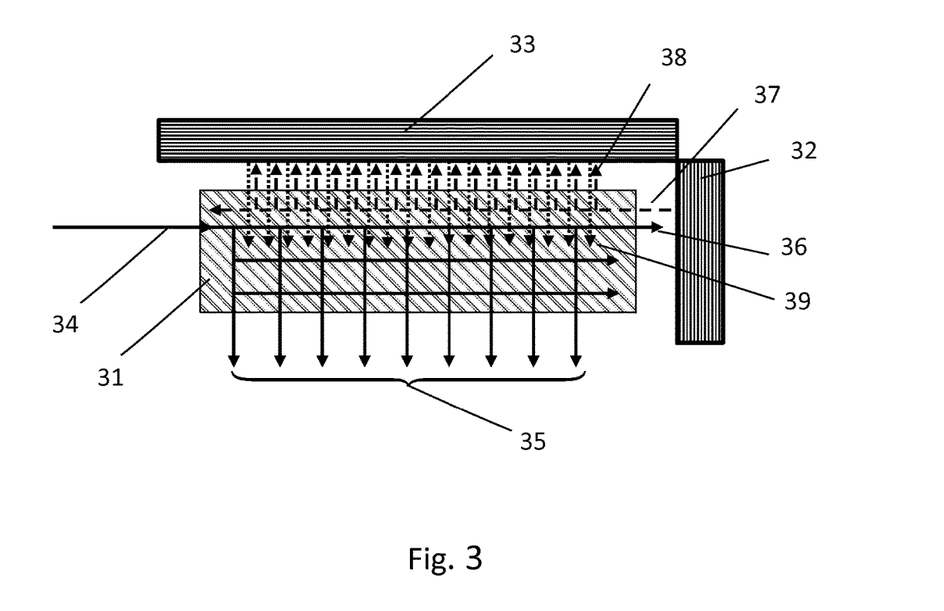
FIG. 3 shows a detailed top view of grating mirrors associated with an EPE grating.

In FIG. 3, two grating mirrors 32, 33 are used to enhance the efficiency of an EPE grating 31. When the incident ray 34 interacts with the EPE grating 31, vertical and horizontal output rays 36, 38 are generated. The horizontal output rays 35 propagate towards the out-coupler. A vertical output ray 36 hits a vertically arranged grating mirror 32 and gets reflected back towards the EPE grating. The vertical grating mirror 32 has a grating vector $G_{VM-EPE}=-2G_{IC}$. Due to the direction of the EPE grating vector, the rays 37 propagating towards the in-coupler partially split into rays 38 that propagate upwards towards the horizontal grating mirror 33 having the grating vector $G_{HM-EPE}=-2\ G_{OC}$, where $G_{OC}$ is the grating vector of the out-coupling grating. The reflected rays 39 interact again with the EPE grating. The light rays diffract and split inside EPE. A part of the diffracted rays ends up to the out-coupler and some on the vertical grating mirror. This means that if the grating mirrors would have 100% efficiency, light would escape essentially only towards the out-coupler and no light would be lost.

Figure 4A:
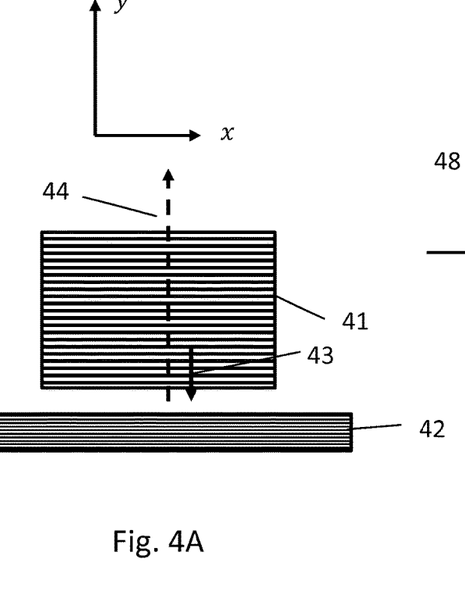
FIG. 4A shows a detailed top view of a grating mirror associated with an out-coupling grating.

FIG. 4A shows an out-coupler 41 with a grating mirror 42. A ray 43 that has travelled through the out-coupler diffracts from the grating mirror producing the reflected ray 44. The reflected ray travels through the out-coupler 41 and partially out-couples towards the eye. The grating mirror 42 has a grating vector $G_{M-OC}=2\ G_{OC}$.

Figure 4B:
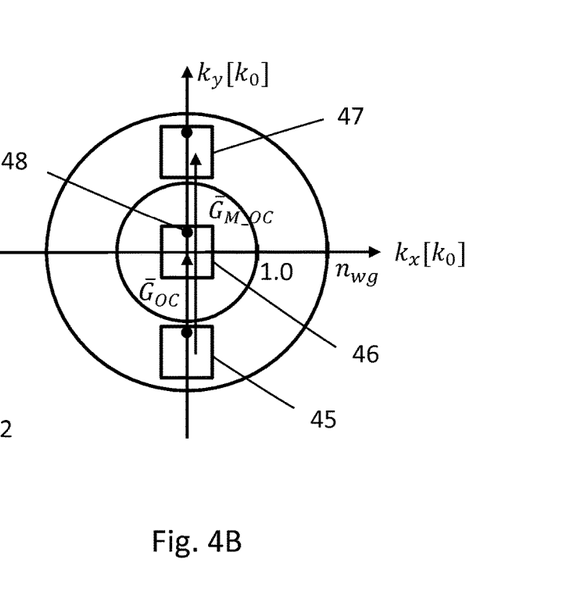
FIG. 4B shows k-space representation of the mirroring event taking place in the configuration of FIG. 4A.

FIG. 4B shows how the normalized wave vector components of the virtual image are shifted by the grating vectors of the out-coupler 41 and the grating mirror 42 in the ($k_x, k_y$) plane. The out-coupler 41 moves the image box from a first location 45 inside the "refraction index donut" to a second location 46 in the center while the grating mirror 42 moves the image from the first location 45 to a third location 47, sill inside the "donut", propagating into the opposite direction. When a light ray propagates via total internal reflection inside the lightguide, the ($k_x, k_y$) normalized wave vector has a length that is larger than one (refractive index of air) but smaller than the refractive index of the waveguide ($n_{wg}$). The longer the ($k_x, k_y$) vector, the longer the jumps the ray takes when propagating between the waveguide surfaces.

FIG. 4B also shows how the location of an image point 48 (marked by black dot) changes in respect of the unit circle after the grating reflection. The distance gets larger. This means that after the grating reflection, the ray propagates with longer jumps. The reverse happens for the ($k_x, k_y$) points that are closer to the outer than the inner boundary. Thus, the grating mirror can be used to obtain more uniform intensity distribution at the out-coupler as the average jump lengths of downward and upward propagating rays gets more equalized. This also means that the in-coupler can be made smaller in one dimension as typically the size of the in-coupler is defined from the maximum jump lengths that rays take inside the lightguide. The smaller the in-coupler, the smaller the projector, and better the form factor of the eyewear. The more uniform intensity distribution at the out-coupler also means that the uniformity of white color over the field of view and the eyebox gets better.

Figure 5A:
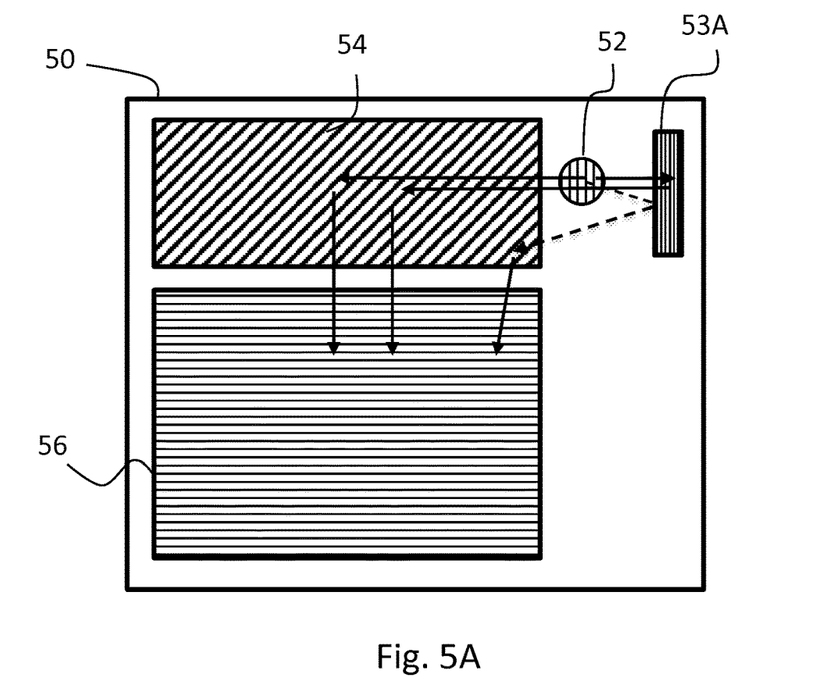
FIGS. 5A-D show waveguide general views of waveguide elements comprising waveguide mirrors in different positions thereof.

FIGS. 5A-D illustrate the embodiments described above in detail with the aid of an exemplary waveguide 50 comprising an in-coupler 52, EPE grating 54 and out-coupler 56. In FIG. 5A, there is an in-coupling grating mirror 53A positioned behind the in-coupler 52.

The mirror 53A and EPE 54 are positioned to with respect to the in-coupler 52 such that the EPE is capable of capturing rays exiting the in-coupler in the "wrong" direction also into at least some oblique angles. This increases the homogeneity of the image in the front corner area. As discussed above with reference to FIGS. 2A and 2B, improvement of efficiency can also be achieved by capturing using directly horizontal rays, in particular taking advantage of polarization.

Figure 5B:
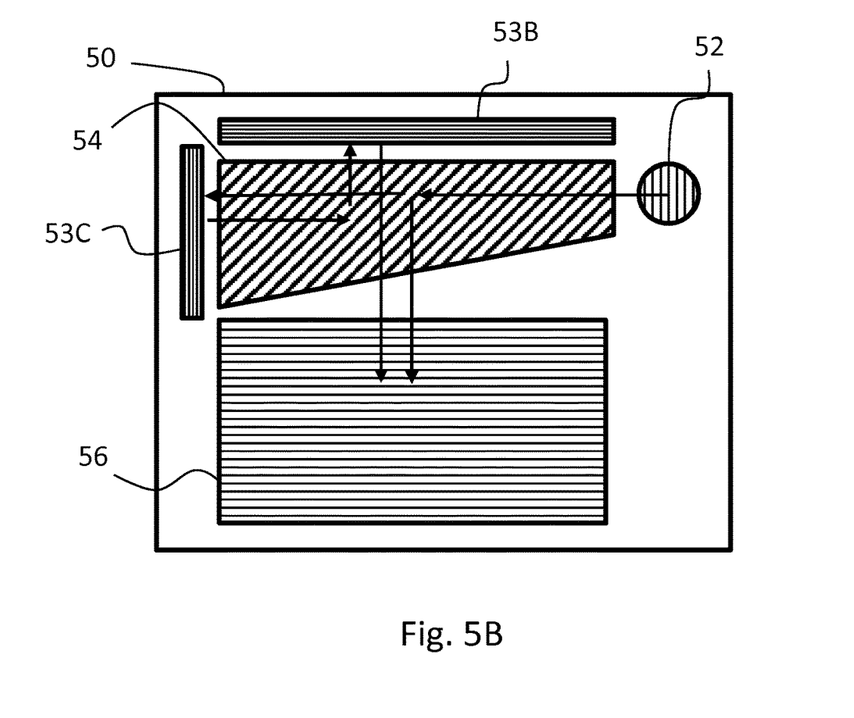

FIG. 5B schematically illustrates the benefits of using a horizontal and a vertical mirror grating 53B, 53C, respectively, adjacent to the EPE grating 54. As can be seen, the portion of light that passes the EPE horizontally is mirrored back by the vertically arranged mirror grating 53C. A significant portion of mirrored light is further directed to the horizontally arranged mirror grating 53B by the EPE, and further reflected back towards the out-coupler 56.

Figure 5C:
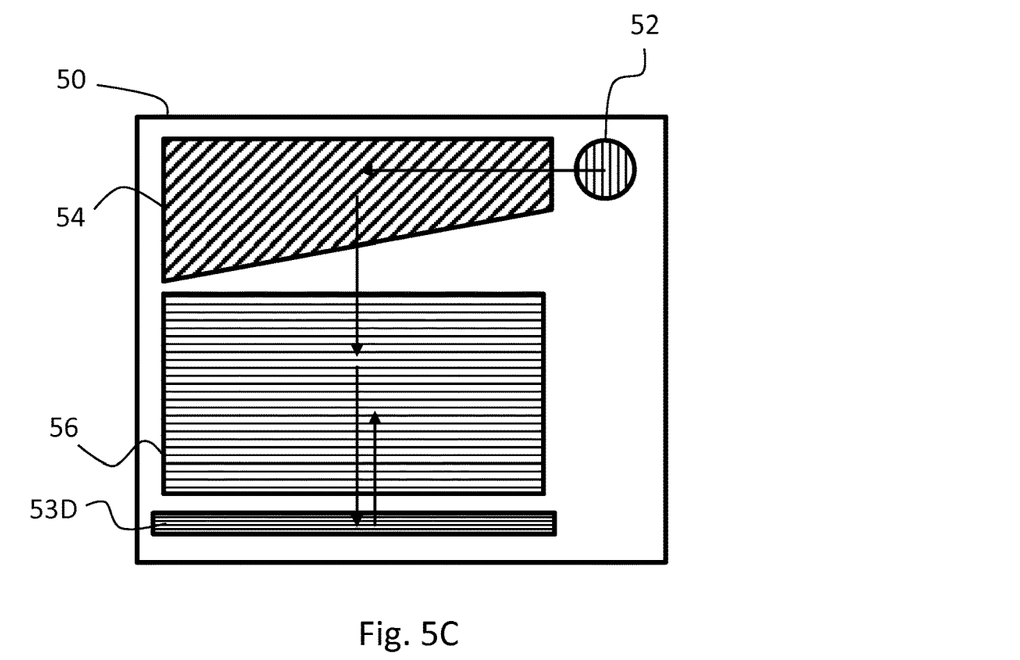

FIG. 5C illustrates the benefit of a mirror grating 53B behind the out-coupler 56.

Figure 5D:
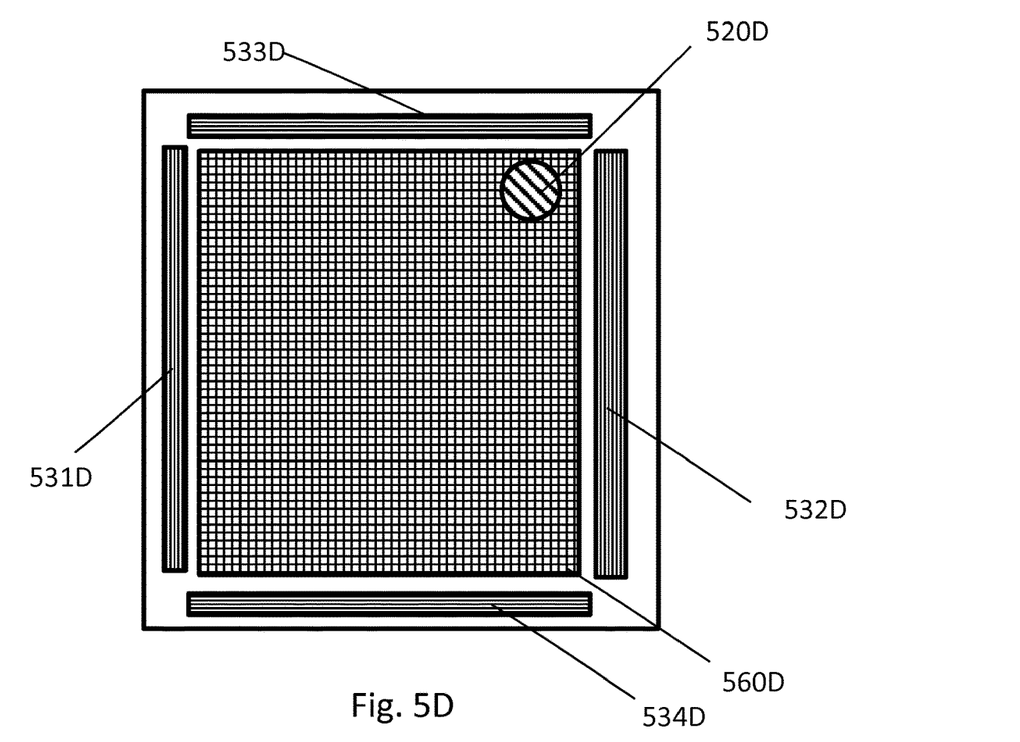

FIG. 5D shows a grating configuration in which a doubly periodic out-coupling/pupil expansion grating 560D is surrounded by horizontal (533D, 534D) and vertical (531D, 532D) grating mirrors. The in-coupling grating 520D can be a normal linear grating or a doubly periodic grating. The in-coupling grating 520D can be located within the outer boundaries of the combined out-coupling/pupil expansion grating 560D, as shown in FIG. 5D, or on a side thereof.

In all cases, the mirror grating preferably has a width that is at least the same or larger than the respective dimension of the grating it is associated with. The perpendicular in-plane dimension, i.e. length in the main propagation direction, of the mirror grating is preferably larger than the hop (jump) length of the rays propagating via total internal reflections in the waveguide, which depends on the thickness of the substrate, the wavelength(s) used and the propagation angles of the rays as determined by the gratings.

In some embodiments, the mirror grating has an essentially rectangular shape. Typically, the dimension of the grating mirror parallel to its grating vector (length) is shorter than the dimension along the grating lines (width).

Figure 6:
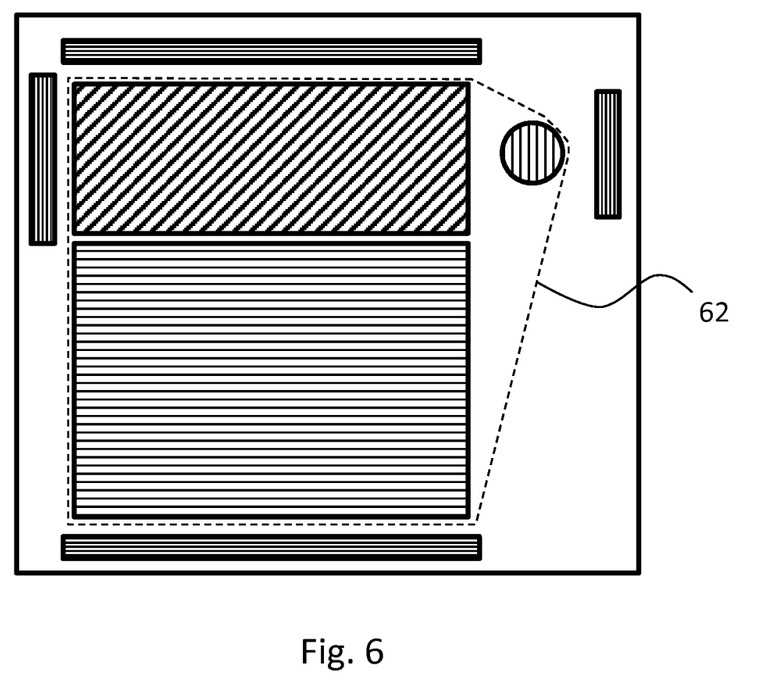
FIG. 6 illustrates the primary propagation zone and path of light.

Finally, FIG. 6 illustrates a primary propagation zone 62, which is laterally spanned by the in-coupling, out-coupling and EPE gratings (i.e. a zone fully enclosing the gratings with minimum circumference; like a rubber band placed around the gratings). Thus, the primary route is entirely defined by these gratings together with properties of the waveguide, whereby the primary propagation path of the rays remains inside this zone. The mirror gratings are located outside this zone. It is however not excluded that some portions of the mirror gratings would be inside the primary propagation zone 62, as the case might be in the configuration of FIG. 2B, for example. However, typically, at least 50%, such as at least 75% of each mirror grating is outside this zone 62.

In some applications, in which large exit pupil is not required, the EPE grating can be omitted.

Instead or in addition to an EPE grating, the element may comprise one or more intermediate gratings adapted to modify the light field inside the waveguide. One or more additional grating mirrors may be associated with such additional gratings.

While in typical embodiments, which are beneficial in terms of simplicity of manufacturing, the grating mirror is located on the same surface of the waveguide than the grating it is associated with, it can also be located on the other surface. It is also not excluded that there are mirror gratings on both surfaces.

It should be noted that the invention is applicable also in various other display geometries and configurations. For example, the field-of-view (FOV) or total wavelength range can be split by a suitable grating arrangement such that the FOV or wavelengths propagate at least partly along different routes. In these cases, the mirror gratings and principles herein discussed can be used for all these gratings and routes separately.

In the case of multilayer waveguides, each layer carrying for example a different wavelength band, embodiments of the invention can be applied separately to each layer.

Embodiments of the invention are usable both with broadband illumination and narrowband (including narrow multiband) illumination and projectors.

The waveguide can be a planar piece of transparent material, typically plastic or glass, having two parallel main surfaces. All gratings 52, 53A-D, 54, 56 can be fabricated for example as surface relief gratings (SRGs) or by providing additional material onto the surface as diffractive features, or other diffractive optical elements (DOEs). In one example, the gratings comprise linear features made of at least one oxide or nitride material, such as $TiO_2$, $Si_3N_4$, and $HfO_2$, on a glass waveguide.

The invention claimed is:

1. A diffractive display element comprising
a waveguide body,
an in-coupling region for diffractively coupling light into the waveguide body,
an out-coupling region for diffractively coupling light out of the waveguide body, said light being adapted to propagate from said in-coupling region to the out-coupling region along a primary route,
wherein the element further comprises at least one grating mirror outside said primary route for diffractively mirroring light strayed from said primary route back to said primary route,
the grating mirror is located behind the in-coupling region, as seen from the primary route, and/or
the out-coupling region comprises a combined out-coupling and exit pupil expansion grating, and there are grating mirrors provided on at least two sides of the out-coupling region, and/or
the element further comprising an exit pupil expander region on said primary route, and there are two grating mirrors located behind the exit pupil expander region, as seen from the primary route, on two different sides of the exit pupil expander region.

2. The element according to claim 1, wherein:
the in-coupling region comprises a grating having an in-coupling period and the out-coupling region comprises a grating having an out-coupling period, and
the grating mirror comprises a grating having a grating mirror period, which amounts to half of the in-coupling period or out-coupling period.

3. The element according to claim 1, wherein the grating mirror is adapted to use the first reflective diffraction order for said mirroring.

4. The element according to claim 1, wherein the grating mirror is configured to reflect light essentially into an opposite propagation direction with respect to the propagation direction of the strayed light.

5. The element according to claim 1, wherein the grating mirror is adapted to direct at least part of light diffracted from the in-coupling area to the grating mirror past the in-coupling region to the primary route, in particular towards an exit pupil expander grating thereon.

6. The element according to claim 1, wherein the in-coupling region is polarization-sensitive and the element comprises means for changing the polarization state of the mirrored light, for preventing out-coupling of mirrored light passing the in-coupling region.

7. The element according to claim 1, wherein the grating mirror is located behind the out-coupling region, as seen from the primary route.

8. The element according to claim 1, wherein:
the out-coupling region comprises a combined out-coupling and exit pupil expansion grating, and
there are mirror gratings provided on four sides of the out-coupling region.

9. The element according to claim 1, wherein said strayed light comprises at least one of:
light escaping the in-coupling region into opposite diffraction order than light directly directed to said primary route,
light escaping the out-coupling region without being coupled out therefrom,
light escaping an exit pupil expander region towards its original propagation direction, and
light escaping an exit pupil expander region into opposite direction than the out-coupling region.

10. The element according to any of the preceding claims, wherein:
the in-coupling region comprises an in-coupling grating arranged on a surface of the waveguide and the grating mirror is located on the same surface of the waveguide than the in-coupling grating, and/or
the out-coupling region comprises an out-coupling grating arranged on a surface of the waveguide and the grating mirror is located on the same surface of the waveguide than the out-coupling grating.

11. The element according to claim 1, wherein at least a majority of the grating mirror, such as the entire grating mirror, is located outside a zone, which is laterally spanned by the in-coupling and the out-coupling regions and, optionally, an exit pupil expander region.

12. The element according to claim 1, wherein the dimension of the grating mirror in the primary mirroring direction is larger than the hop length of light in-coupled to the element.

13. The element according to claim 1, further comprising a plurality of such grating mirrors.

14. A personal display device, such as a head-mounted display (HMD) or head-up display (HUD), comprising:
a diffractive display element according to claim 1, and
an image projector for presenting an image to the in-coupling region.

15. The personal display device of claim 14, wherein:
the in-coupling region of the diffractive display element comprises a grating having an in-coupling period, and
the out-coupling region of the diffractive display element comprises a grating having an out-coupling period and the grating mirror comprises a grating having a grating mirror period, which amounts to half of the in-coupling period or out-coupling period.

16. The personal display device of claim 14, wherein the grating mirror of the diffractive display element is adapted to use the first reflective diffraction order for said mirroring.

17. The personal display device of claim 14, wherein the grating mirror of the diffractive display element is configured to reflect light essentially into an opposite propagation direction with respect to the propagation direction of the strayed light.

18. The element according to claim 2, wherein the grating mirror is adapted to use the first reflective diffraction order for said mirroring.

19. The element according to claim 2, wherein the grating mirror is configured to reflect light essentially into an opposite propagation direction with respect to the propagation direction of the strayed light.

20. The element according to claim 2, wherein the grating mirror is adapted to direct at least part of light diffracted from the in-coupling area to the grating mirror past the in-coupling region to the primary route, in particular towards an exit pupil expander grating thereon.

21. The element according to claim 1, wherein:
the primary route is in the waveguide within a primary propagation zone from the in-coupling region along an intended route of travel to the out-coupling region and out of the waveguide body; and
the strayed light has a strayed route in the waveguide outside of the primary propagation zone, the strayed route being from diffraction in one or more diffraction orders away from the primary route or from a light ray traveling across at least one grating region on the primary route without interacting with the at least one grating region.

* * * * *